United States Patent [19]

Wiese, deceased et al.

[11] 4,016,150
[45] Apr. 5, 1977

[54] SULFUR AND NITROGEN-CONTAINING ORGANIC COMPOSITIONS PROCESSES FOR MAKING THEM AND FUELS AND ADDITIVES CONTAINING THEM

[75] Inventors: Herbert Frederick Wiese, deceased, late of Cleveland, Ohio, by Helen G. Wiese, executrix, Mayfield Village, Ohio; Emil Thomas Wierber, Mayfield Village, Ohio

[73] Assignee: The Lubrizol Corporation, Cleveland, Ohio

[22] Filed: May 1, 1975

[21] Appl. No.: 573,706

Related U.S. Application Data

[62] Division of Ser. No. 401,494, Sept. 27, 1973, Pat. No. 3,912,641.

[52] U.S. Cl. .................... 260/128; 260/125; 260/132; 260/133; 260/134; 260/135; 260/327 E
[51] Int. Cl.$^2$ ............................ C07G 17/00
[58] Field of Search ........... 260/327 E, 132, 125, 260/133, 134, 135

[56] References Cited

UNITED STATES PATENTS

| 3,200,107 | 8/1965 | Le Suer | 260/132 |
| 3,634,457 | 1/1972 | Doyles | 260/327 E |

*Primary Examiner*—Delbert R. Phillips
*Attorney, Agent, or Firm*—James W. Adams, Jr.; Daniel N. Hall

[57] ABSTRACT

Organic compositions made by reacting an amino compound, carbon disulfide, and a halogenated substantially aliphatic hydrocarbon having at least 25 carbon atoms are useful as additives for lubricants and liquid fuels. Particularly useful are compositions wherein the amino compound is alkylene polyamine and the hydrocarbon is a halogenated polymer or interpolymer of a $C_2$ to $C_6$ 1-olefin.

20 Claims, No Drawings

SULFUR AND NITROGEN-CONTAINING ORGANIC COMPOSITIONS PROCESSES FOR MAKING THEM AND FUELS AND ADDITIVES CONTAINING THEM

There is a division of application Ser. No. 401,494 filed Sept. 27, 1973, now U.S. Pat. No. 3,912,641.

FIELD OF THE INVENTION

This invention relates to compositions which are useful as additives for fuels and lubricants. More particularly it concerns compositions made by reacting an amino compound, carbon disulfide and a halogenated substantially aliphatic hydrocarbon of at least 25 carbon atoms. The invention also relates to lubricant and liquid fuel compositions containing minor but effective amounts of these nitrogen- and sulfur-containing compositions.

BRIEF DESCRIPTION OF THE PRIOR ART

The use of nitrogen- and sulfur-containing organic compositions in petroleum products such as fuels and lubricants as additives to improve one or more performance characteristics of the product is well known. Such characteristics as anti-corrosivity, detergency, dispersancy, oxidation resistance and the like are markedly improved by the use of certain additives.

U.S. Pat. No. 3,200,107 discloses the preparation of sulfur- and nitrogen-containing compositions from an alkylene amine, a hydrocarbon-substituted dicarboxylic acid and carbon disulfide while U.S. Pat. No. 3,256,185 discloses lubricating compositions containing such sulfur- and nitrogen-containing compositions.

U.S. Pat. Nos. 3,275,554; 3,454,555; 3,438,757; 3,565,804 and 3,574,576, among others, describe the preparation of amines and alkylene polyamines containing high molecular weight hydrocarbyl substituents and their use in fuels and lubricants. These patents are expressly incorporated by reference herein by reference for their disclosure of halogenated substantially aliphatic hydrocarbons containing at least 25 carbon atoms, methods for preparing the same, the method for reacting such halogenated substantially aliphatic hydrocarbons with amines, and the resulting substituted amines so produced.

Despite this knowledge, the increasing severity of engine operation and the desire to keep engines clean and operating at peak efficiency for easier emission control, have prompted a continuing search for more effective and economical products.

SUMMARY OF THE INVENTION

A new class of organic sulfur- and nitrogen-containing compositions has now been found which are useful as additives for lubricants and normally liquid fuels. These compositions are made by reacting, at a temperature above about 0° C., (A) at least one amino compound selected from the group consisting of amines, hydroxy amines, heterocyclic amines, polyamines, hydrazine, organically substituted hydrazines and ammonia, (B) carbon disulfide, and (C) at least one halogenated aliphatic hydrocarbon of at least about 25 carbon atoms.

DESCRIPTION OF THE INVENTION

Reactant (A) of this invention is an amino compound selected from the group consisting of amines, hydroxy amines, heterocyclic amines, polyamines, hydrazines, organically substituted hydrazines, hydroxyl amines, and ammonia. Among the amines useful in preparing the compositions of this invention are monoamines. These monoamines can be primary, secondary or tertiary. Preferably, however, they are primary or secondary, i.e., they contain a

linkage; more preferably they contain a primary amino group. These amines are substituted with $C_1$-$C_{30}$ hydrocarbyl groups or hydroxy substituted hydrocarbyl groups. Preferably these groups each contain between 1 and 10 carbon atoms and are aliphatic in nature.

When reference in this specification and the appended claims is made to "hydrocarbyl" and "aliphatic" groups it is to be understood, unless expressly stated otherwise, that reference is also being made to substantially aliphatic and substantially hydrocarbyl groups. Substantially aliphatic and substantially hydrocarbyl groups are those which contain no non-hydrocarbyl substituents or non-aliphatic substituents which significantly affect the hydrocarbyl or aliphatic nature or properties of the group relevant to their use as described herein, such as oil solubility, oxidative stability, etc. For example, it is obvious, in the context of this invention, that a purely hydrocarbyl $C_{20}$ alkyl group and a $C_{20}$ alkyl group substituted with a methyl mercapto or methoxyl group would be subtantially similar in their properties with regard to their use in this invention and would, in fact, be recognized as equivalents in this invention by one of ordinary skill in the art. That is, one of skill in the art would recognize both such groups to be "substantially hydrocarbyl".

Non-limiting examples of substituents which do not significantly alter the hydrocarbyl or aliphatic nature of the hydrocarbyl or aliphatic groups of this invention are the following:

Ether (especially hydrocarbyloxy and particularly alkoxy groups of up to ten carbon atoms)
Oxo, e.g., keto
Oxa, e.g., —O— linkages in a main hydrocarbyl chain
Nitro
Cyano
Fluoro
Thioether (especially $C_1$ to $C_{10}$ alkyl thioethers)
Thia, e.g., —S— linkages in a main aliphatic chain
Sulfinyl
Sulfonyl
Aryl, e.g., phenyl, benzyl, tolyl In general, if such non-hydrocarbyl or non-aliphatic substituents are present, there will be no more than about two such substituents for each 10 carbon atoms in the hydrocarbyl or aliphatic group and preferably not more than one for each 10 carbon atoms. Generally, however, it is more preferred that no such substituents be present and that the hydrocarbyl or aliphatic groups of this invention be purely hydrocarbyl or purely aliphatic.

The hydrocarbyl groups of the monoamines of this invention can each be independently selected from aliphatic, cycloaliphatic, aromatic groups (including aliphatic- and cycloaliphatic-substituted aromatic groups and aromatic-substituted aliphatic and cycloaliphatic groups). Specifically among these amines, can be, for example, ethyl amine, diethyl amine, n-butyl amine, di-n-butyl amine, isobutyl amine, coco amine, stearyl amine, lauryl amine, dimethyl lauryl amine, diethyl lauryl amine, oleyl amine, aniline, paramethyl aniline, diphenyl amine, benzyl amine, tolyl amine, methyl-2-cyclohexyl amine, etc. Mixtures of such amines can also be used.

Among the hydroxy amines of the present invention are the hydroxy-hydrocarbyl-substituted analogs of the afore-described monoamines such as ethanol amine, di-3-propanol amine, 4-hydroxybutyl amine, triethanol amine, n-methyl-2-propyl amine, 3-hydroxy aniline, etc. While it is preferred that such hydroxy amines contain only one hydroxyl group per molecule, those containing more, such as diethanol amine and tris(hydroxymethyl)methyl amine are also suitable for use in this invention.

Heterocyclic amines are also useful in preparing the compositions of this invention. The cycle can also incorporate unsaturation and can be substituted with alkyl, alkenyl, aryl, alkaryl or aralkyl groups. In addition the cycle can also contain other heteroatoms such as oxygen and sulfur or other nitrogen atoms including those not having nitrogen bonded to hydrogen atoms. Generally, these cycles have 3 to 10, preferably 5 to 6 ring members. Among such heterocycles are substituted and unsubstituted aziridines, azetidines, azolidines, tetra- and dihydropyridines, pyrroles, piperidines, imidazoles, indoles, di- and tetrahydroimidazoles, piperazines, isoindoles, purines, morpholines, thiamorpholines, N-aminoalkyl morpholines, N-aminoalkyl thiomorpholines, azepines, azocines, azoinines, azecinines and tetra-, di- and perhydrol-derivatives of each of the above.

Polyamines are also useful in preparing the compositions of this invention. Among these polyamines are alkylene polyamines including those conforming in the most part to the formula

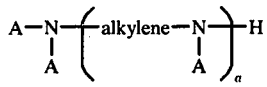

wherein $a$ is an average of integers between 1 and about 10, preferably between 2 and 8; each A is independently a hydrogen atom, a hydrocarbyl group or a hydroxy-substituted hydrocarbyl group having up to about 30 atoms. Preferably A is an aliphatic or hydroxysubstituted-aliphatic group of up to about 10 carbon atoms, "Alkylene" is a lower alkylene group having between 1 and 10, preferably 2 to 6, carbon atoms. Especially preferred are the alkylene polyamines where each A is hydrogen with the ethylene polyamines being the most preferred. Such alkylene amines include methylene polyamine, ethylene polyamines, butylene polyamines, propylene polyamines, pentylene polyamines, hexylene polyamines, heptylene polyamines, etc. The higher homologs of such amines and related heterocyclic amines such as piperazines and aminoalkyl-substituted piperazines are also included.

Polyamines useful in this invention are exemplified specifically by: ethylene diamine, triethylene tetramine, tris(2-aminoethyl)amine, propylene diamine, trimethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl) imidazoline, 4-methylimidazoline, 1,3-bis(2-aminoethyl)imidazoline, pyrimidine, 1-(2-aminopropyl)piperazine, 1,4-bis(2-aminoethyl)piperazine, 2-methyl-1-(2-aminobutyl) piperazine, etc. Higher homologs are obtained by condensing two or more of the above-illustrated alkylene amines likewise are useful as are mixtures of two or more of the afore-described polyamines.

Ethylene polyamines, as mentioned above, are especially useful for reasons of cost and effectiveness. Such polyamines are described in detail under the heading "Ethylene Amines" in "Encyclopedia of Chemical Technology", Kirk and Othmer, Volume 5, pages 898–905, Interscience Publishers, New York (1950). Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines. These mixtures are particularly useful in preparing the compositions of this invention. On the other hand, quite satisfactory products can also be obtained by the use of pure alkylene polyamines.

Hydroxyalkyl-substituted alkylene polyamines, i.e., alkylene polyamines having one or more hydroxyalkyl substituents on the nitrogen atoms, likewise are useful in this invention. Preferred hydroxyalkyl-substituted alkylene polyamines are those in which the hydroxy alkyl group is a lower hydroxy alkyl group, i.e., having less than about 10 carbon atoms. Examples of such hydroxyalkyl-substituted polyamines include N-(2-hydroxyethyl)ethylene diamine, N,N'-bis(2-hydroxyethyl)ethylene diamine, 1-(2-hydroxyethyl) piperazine, mono-hydroxypropyl-substituted diethylene triamine, 1,4-bis(2-hydroxypropyl)piperazine, di-hydroxypropyl-substituted tetraethylene pentamine, N-(3-hydroxybutyl) tetramethylene diamine, etc.

Higher homologues such as are obtained by condensation of the above illustrated alkylene amines or hydroxy alkyl-substituted alkylene amines through amino radicals or through hydroxy radicals as well as mixtures of the above are likewise useful.

Reactant (A) can also be hydrazine or an organo-sustituted hydrazine of the general formula

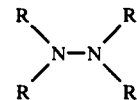

wherein each R is independently hydrogen or a $C_1$–$C_{30}$ hydrocarbyl group. Preferably, at least one R is a hydrogen atom and the other R groups are $C_1$–$C_{10}$ aliphatic groups. More preferably at least two R groups are hydrogen. Most preferably, at least two R groups are hydrogen and the remaining R groups are alkyl of up to ten carbon atoms.

Examples of substituted hydrazines are methylhydrazine, N,N-dimethylhydrazine, N,N'-dimethylhydrazine, phenylhydrazine, N-phenyl-N'-ethylhydrazine, N-(p-tolyl)-N'-(n-butyl)hydrazine, N-(p-nitrophenyl)-N-methylhydrazine, N,N'-di-(p-chlorophenyl)hydrazine, N-phenyl-N'-cyclohexylhydrazine, etc.

Reactant (A) can also be hydroxylamine or hydrocarbyl substituted hydroxylamine analog of the general formula:

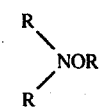

wherein the R groups have the same meaning described above and the same preferences are used in choosing them.

When (A) is a hydrazine, it is most preferably hydrazine itself or a mono-substituted hydrazine. When (A) is a hydroxylamine, it is hydroxylamine itself or an O-substituted hydroxylamine. In addition to hydrazine and hydroxylamine, or analogs thereof, suitable inorganic salts which yield free hydrazine or hydroxylamine under the reaction conditions may also be used, such as hydrazine sulfate and hydroxylamine hydrochloride.

Mixtures of two or more of the afore-described amino compounds can also be used in making the compositions of this invention. It is preferred that the amino compounds used have at least one

linkage within their structure.

Reactant (B) is carbon disulfide. In addition to carbon disulfide itself, compounds which generate carbon disulfide under the conditions of the reaction can also be used. Such compounds include metal trithiocarbonate salts, xanthates, low molecular weight dithiocarbamates, etc.

Reactant (C) is a halogenated aliphatic hydrocarbon of at least 25 carbon atoms. While pure halogenated hydrocarbons such as 3-bromo triacontane, 6-chloro-tetracontane, 3-iodo-dotetracontane, etc., or mixtures thereof, can be used, it is often preferred to use halogenated derivatives of olefinic polymers. These halogenated derivatives range in number average molecular weight from about 400 to about 100,000 (still higher molecular weight derivatives may be useful and actually preferred when it is desired that the product have viscosity improving properties). Especially useful are derivatives having number average molecular weights ranging from about 700 to about 5000, such as number average molecular weights of 600, 800, 1900, 2500, 3000, etc. These derivatives contain on the average at least one atom of halogen per molecule of hydrocarbon up to an average of about 1 atom of halogen per 25 carbon atoms in said hydrocarbon molecule. Thus, for example, a chlorinated derivative of a polymer of molecular weight 1000 would contain at least about 35.5 grams of chlorine per 1035.5 grams of chlorinated derivative. While chlorinated, brominated and iodidated hydrocarbons are useful in this invention, chlorinated and brominated hydrocarbons are particularly preferred.

The preferred olefin polymers from which the afore-described halogenated derivatives are obtained are polymers of an alkene or mixtures of alkenes, such as monoolefins having 2 to 20 carbon atoms; particularly preferred are homo and interpolymers of 1-olefins having about 2 to about 6 carbon atoms such as ethylene, propylene, 1-butene, isobutene, 1-pentene, and 1-hexene. Nevertheless, polymers of 1-octene, 2-methyl-1-heptene, 3-cyclohexyl-1-butene, and 2-methyl-5-propyl-1-hexene can also be used as well as polymers of medial olefins of 2 to 20, preferably 2 to 6 carbons, i.e., olefins in which the olefinic linkage is not in the terminal position, such as 2-butene, 3-pentene and 4-octene.

As noted above, interpolymers of the afore-described olefins can also be used as source materials for the halogenated aliphatic hydrocabons of the present invention. Such interpolymers include, for example, those prepared by polymerizing isobutene with ethylene; propylene with isoprene; ethylene and piperylene; hexene with 1,3-hexadiene; 1-octene with 1-hexene; 1-heptene with 1-pentene; 3-methyl-1-butene with 1-octene; 3,3-dimethyl-1-pentene with 1-hexene; isobutene with both propene and ethylene, etc.

The relative proportion of aliphatic olefin monomers to other polymerizable monomers in the polymeric precursors of the halogenated hydrocarbons of the present invention should be such that the polymers are substantially aliphatic (in the sense discussed above) and substantially saturated after halogenation. Thus the polymers should contain at least 80%, preferably at least 95%, saturated units derived from an aliphatic monoolefin and no more than 5% olefinic linkages based on the total number of carbon-to-carbon covalent linkages present. Specific examples of such interpolymers include the copolymer of 95% (by weight) isobutene with 5% allene; the terpolymer of 98% isobutene with 1% piperylene and 1% 1-pentene; the terpolymer of 95% isobutene with 2% 1-butene and 3% styrene; the terpolymers of 95% isobutene with 4% propene and 1% butadiene; the copolymer of 80% 1-hexene with 20% 1-heptene; the terpolymer of 90% isobutene with 2% cyclohexene and 8% propene; etc. (All percentages and parts in this specification and the appended claims are percentages by weight and parts by weight unless otherwise specified.)

Chlorinated and brominated polymers of butene, particularly of isobutene, are especially preferred for use in this invention. Such polymers are conveniently obtained by polymerizing a butene such as isobutene with the use of a Friedel-Crafts catalyst such as aluminum chloride, boron trifluoride, titanium tetrachloride or the like. When commercial isobutene is used in the polymerization, the polymer may contain a small amount of polymerized units of 1-butene or 2-butene which are often present as impurities in commercial isobutene. For the purposes of this invention, a polyisobutene may thus contain small proportions of polymerized or interpolymerized 1-betene or 2-butene.

The halogenated hydrocarbons of this invention, i.e., reactant (C), are conveniently prepared by treating suitable hydrocarbons, such as polymers described above, with a halogenating agent such as chlorine, bromine, N-bromosuccinimide, N-iodo-phthalimide, etc. Such techniques are well-known to those of skill in this art. For example, the treatment can be carried out simply by contacting the hydrocarbon with the halogenating agent at a temperature from about 50° C., preferably from about 80° C., up to any temperature below the decomposition point of the reaction mixture. Usually such halogenations are carried out between 80° and 250° C., the exact temperature being determined by the precise nature of the halogenating agent and hydrocarbon to be halogenated. The relative amounts of hydrocarbon carbon and halogenating agent used in the reaction are such as to provide incorporation of an average of at least about one atomic proportion of halogen per hydrocarbon molecule and up to about one atomic proportion of halogen per 25 aliphatic carbon atoms in the hydrocarbon molecules. Such amounts, in most instances, are about 1 mole of the hydrocarbon and at least about 1 mole of the halogenating agent.

Halogenated hydrocarbons useful in the present invention contain an average of at least 1 and often 2 or more, such as 10, atomic proportions of halogen per hydrocarbon molecule, especially in instances where the hydrocarbon is of relatively high molecular weight such as 1000 or higher. In most instances, the halogen contents of such halogenated hydrocarbons are between about 0.1% and 15%, preferably between about 2% and about 9% of the total weight of the halogenated hydrocarbon. To form the more highly halogenated polymers, of course, two or more moles of the halogenating agent are used for each mole of polymer to be halogenated. As noted above, the halogenated hydrocarbons contains a maximum of about one halogen atom per 25 carbon atoms.

The halogenation can be carried out in the presence of a substantially inert solvent or diluent such as carbon tetrachloride, chloroform, chlorobenzene, benzene, etc. The reaction is often accompanied by the formation of hydrogen halide which may simply be allowed to escape from the reaction mixture as the treatment proceeds. The precise chemical composition of the halogenated polymer is not always known; it is known, however, that such product does, on the average, contain about one or more halogen substituents per molecule.

It is also possible to form a suitable halogenated polymer by interpolymerization of, e.g., isobutene, with a halogenated monomer such as chloroprene, vinyl bromide, etc., by selecting a proper ratio of non-halogenated polymerizable olefin to polymerizable halo-olefin to achieve a halogen content in the interpolymer within the limits set forth above.

The method by which the halogen is incorporated into the olefin polymer is not critical to the practice of this invention. Hence, any method known to the art for halogenating hydrocabons can be used and products of such methods are contemplated for use as reactants in this invention. Also, it is clear that mixtures of halogenated hydrocarbons can be used.

In the practice of this invention, the above-described reactants (A), (B) and (C) are contacted at a temperature of at least about 0° C. up to the decomposition point of the reaction mixture. By "decomposition point of the reaction mixture" is meant the lowest temperature at which significant thermal degradation of a reactant, reaction product, or diluent occurs. Preferably the reaction is carried out between about 0° and about 250° C; most preferably the reaction temperature is between about 75° and 150° C. The reaction normally is carried out over a period of about 0.1 to about 48, preferably 1 to 10 hours. The reaction can be carried out at subatmospheric pressure, atmospheric pressure, or superatmospheric pressure but normally is carried out at atmospheric pressure.

Generally, the reactant (A), (B) and (C) are used in the following amounts:

| Reactant | Range[1] | Preferred Range[1] |
| --- | --- | --- |
| (A) Amine[2], equivalents | about 0.5 – about 6 | about 1 – about 5 |
| (B) Carbon disulfide, moles | about 0.5 – about 5 | about 1 – about 3 |
| (C) Halogenated hydrocarbon | 1 | 1 |

[1]per amount of (C) containing one gram atom of halogen
[2]An equivalent of amine is the average molecular weight of the amino intermediate divided by the number of amino groups present in the molecule, e.g., tetraethylene pentamine has five equivalents per molecule and piperazine has two.

Often, in the reaction of (A), (B) and (C), particularly in the reaction of (A) and (C), it is convenient to have a hydrogen halide acceptor present. Examples of hydrogen halide acceptors which may be used include carbonates, bicarbonates, oxides, hydroxides, amines, in particular tertiary amines (especially pyridines), and salts of organic acids, such as salts of monocarboxylic acids, in particular the alkali metal salts and alkaline earth metal salts or organic acids.

Preference is given to carbonates, bicarbonates, oxides and hydroxides, as the use of these compounds offer the advantage, as compared with the application of other compounds suitable for this purpose, that upon reaction with hydrogen halide in addition to halide only water, and in some cases, carbon dioxide are formed. Although, in general, carbonates, bicarbonates, oxides and hydroxides are suitable hydrogen halide acceptors, preference is given to the alkali metal and alkaline earth metal compounds, in particular sodium, potassium and lithium compounds. Alkali metal (Na, K, Li) carbonates are especially preferred.

The hydrogen halide acceptors are preferably applied in quantities such that from about 1 to about 2 gram equivalents of these substances are present in the reaction mixture per gram atom of halogen present. Generally, about 0.5 to about 2.0 moles of hydrogen halide acceptor per gram atom of halide are used.

The order in which reactants (A), (B) and (C) are reacted with each other is not critical to the practice of this invention. Thus reactant (A) may be reacted with reactant (B) and then with reactant (C). Alternatively reaction (A) can be reacted with (C) and then with reactant (B). It is also possible to simultaneously react (A), (B) and (C). It is preferred, however, to first react (A) with (C) to form an intermediate which is then reacted with (B).

The production of such intermediates from reactants such as (A) and (C) is well known in the art. See, for example, U.S. Pat. No. 3,454,555 and U.S. Pat. No. 3,438,757 which have been incorporated herein by reference for their relevant disclosures. Generally, such intermediates are believed in many cases to be amino intermediates which can be represented by the general formula:

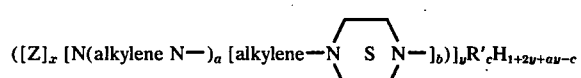

wherein

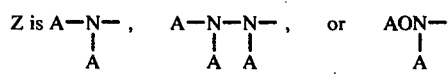

when $x=1$ and Z is A when $x=0$; A is independently hydrogen, a hydrocarbyl group of from 1 up to about 30 carbon atoms, or a hydroxy-hydrocarbyl group of up to about 30 carbon atoms with the proviso that two A groups can be taken together to form a ring of from 5 to 6 annular members and up to 12 carbon atoms;

Alkylene is as defined above;

R' is an aliphatic hydrocarbyl group of from about 400 to about 100,000, preferably from about 700 to about 5000, number average molecular weight;

$a$ is an average of integers from 0 to about 10;

$b$ is an average of integers from 0 to about 5;

$a+2b$ is an average of integers from 1 to about 10;

$c$ is an average of integers from 1 to about 10 and is equal to or less then the number of amino groups in the molecule; $x$ is 0 or 1;

$y$ is 0 or 1; and, $x+y$ equals 1.

The hydrocarbon radical indicated by R' is derived from the halogenated hydrocarbon (C) and thus is limited with respect to the parameters set forth above in the detailed description of (C). Likewise Z and Alkylene are derived from the amino compound (A) and similarly limited by the parameters set forth in the detailed description of (A).

Briefly, when $y=0$ in the above formula the expression is reduced to the following: $ZR_cH_{1-c}$ and conversely when $x=0$, the expression is reduced to

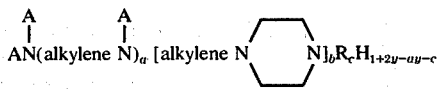

The formulas represent hydrocarbyl amines, polyamines, hydroxy amines, hydrazines and hydroxylamines wherein the hydrocarbyl substituent has a molecular weight of about 400 to 100,000, preferably 700 to about 5000 number average molecular weight. Further descriptions of these types of amino intermediates can be found in the aforementioned U.S. Pat. No. 3,438,757 which also contains a detailed disclosure of how they are formed. Briefly, the amino reactant (A) and the halogenated reactant (C) are mixed, preferably in the presence of a hydrogen halide acceptor and inert solvent, and reacted at about 20° to about 255° C. for about 1 to about 24 hours.

In that preferred mode of the invention wherein (A) is first reacted with (C) to form the afore-described amino intermediate which is then reacted with (B), the reaction of the amino intermediate with (B) is carried out at a temperature of at least 25° C. to about 250° C.; preferably at a temperature of between about 50 and about 150° C. The reaction is normally carried out for a period of time of about 0.1 to 48, preferably about 0.2 to about 24 hours at atmospheric pressure.

Generally, the final products are obtained by simply adding carbon disulfide or suitable substitute therefor to the amino intermediate in the presence or absence of an inert solvent/diluent. Generally, these reactants are mixed in a ratio of about 0.5 to about 6.0, preferably about 1 to about 3 equivalents of amino intermediate per equivalent of $CS_2$. Suitable substantially inert solvents or diluents for this reaction include such relatively low boiling solvents as pentane, heptane, benzene, toluene, xylene, etc., as well as high boiling materials such as solvent neutral oil, bright stock and various types of lubricating oil base stocks well known to those of skill in the art. The product can be recovered from such solvents or diluents by such standard procedures as distillation, evaporation, precipitation, etc. when desired. Alternatively, if the solvent or diluent is, for example, a lubricating base oil, the product can be left in the solvent or diluent and used to form a lubricating or fuel oil composition as described below.

The following examples are specifically preferred embodiments of the present invention.

EXAMPLE 1

(A) A mixture of 176 parts of polyisobutenyl chloride (containing 4.28% chlorine), 15.36 parts of a commercial mixture of polyethylene polyamines having a nitrogen content of 34% and corresponding in elemental composition to tetraethylene pentamine, and 507 parts of normal octyl alcohol is placed in a three-necked three-liter flask equipped with a stirrer, thermometer and reflux condenser. The mixture is heated for 16 hours at 128°–138° C. and then for an additional 4 hours at 158°–230° C. The mixture is decanted from solids and aliphatic petroleum naphtha (433 parts) is added to it. The mixture is then stripped to 220° C./13mm to yield 1047 parts of distillate solvent. After addition of another 597 parts of naphtha to the residue, it is extracted with a mixture of distilled water (487 parts) and 50% aqueous sodium hydroxide (700 parts). The organic layer is extracted three times more with approximately 600 parts of 50% aqueous sodium hydroxide each time. It is then washed with a mixture of 705 parts of water and 273 parts isopropyl alcohol. Washing with a water-isopropyl alcohol mixture is repeated twice more. The aqueous layer from the first extraction is back-extracted with naphtha (518 parts) and the naphtha combined with the other organic extracts. This is distilled at 58°–112° C. until 1858 parts of distillate is collected. Toluene is then added (392 parts) and the mixture stripped to 150°–165° C./10–0.5mm. The residual organic material is filtered through siliceous filter aid to yield, as a product, a filtrate which is characterized by a nitrogen content of 4.4%.

(B) A mixture of 191 parts of the product of 1(A) and 90 parts of benzene is stirred vigorously at room temperature while 76 parts of carbon dilsulfide is added dropwise to it over a period of 0.25 hour. The mixture is then stirred for an additional 3 hours at 60°–70° C. and finally stripped to 82° C./5mm Hg. Eighty parts of a diluent mineral oil is added, and the mixture filtered through filter aid to yield the final product in an oil solution having a nitrogen content of 2.92% and a sulfur content of 1.24%.

EXAMPLE 2

Carbon disulfide, 76 parts, is added dropwise at 50° C. to a mixture of 157 parts of diamylamine, a 20% aqueous solution containing 41 grams of sodium hydroxide, and 782 parts of dimethylformamide. The mixture is then heated at 50°–60° C. for 2 hours, after which time 782 parts (0.945 mole) of polyisobutenyl chloride (Mn 830, 4.3% chlorine) is added. Reaction is heated for 12 hours at 80°–90° C., and finally the volatile material is removed from it by vacuum distillation. The residue is dissolved in benzene, filtered and the benzene removed by vacuum distillation, yielding the desired product as a residue containing 1.41% nitrogen and 5.92% sulfur.

EXAMPLE 3

(A) Polyisobutenyl chloride having a chlorine content of 5.64% is prepared by passing 910 parts of chlorine gas at a rate of 8 CFH for a total of 18 hours through 7057 parts of polyisobutene at room temperature. The desired halogenated hydrocarbon is obtained by blowing the chlorinated reaction mixture with nitrogen for two hours.

(B) A mixture of 3990 parts of the polyisobutenyl chloride described in 3(A), 618 parts of a diethylene triamine, 264 parts of sodium hydroxide, 500 parts of water, 50 parts of potassium iodide, 1000 parts of isopropyl alcohol and 1000 parts of xylene is heated at 85°–90° C. for 3 hours. The mixture is then stripped to 170° C./15mm and filtered through filter aid to yield as a filtrate the desired amino intermediate which has a nitrogen content of 2.30%.

(C) A mixture of 684 parts of the amino intermediate described in 3(B) and 506 parts of diluent oil is heated to 60° C; then 76 parts of carbon disulfide is slowly added to it over 1 hour. Heating is continued at 150° C. for 4 hours. Filtration at 150° C. through filter aid yields a solution of the desired product as a filtrate having a sulfur content of 1.58% and a nitrogen content of 1.2%.

EXAMPLE 4

A mixture of 845 parts of the polyisobutenyl chloride described in 1(A) and 232 parts of a commercial mixture of ethylene polyamines corresponding in stoichiometry to pentaethylene hexamine is heated for 4 hours at 200°–215° C. Then 40 parts of powdered sodium hydroxide is added to the mixture at 115° C; the mixture is then stirred at 115°–130° C. for 1.25 hours. Filtration through 3% filter aid provides a filtrate which is taken up in 1000 parts of toluene. Carbon disulfide (76 parts) is added to the toluene mixture at 35° C. The mixture is then heated at reflux for four hours and stripped to 205° C/22mm. The residue is filtered twice through filter aid to provide as the filtrate the desired product which has a nitrogen content of 6.22% and a sulfur content of 2.89%.

EXAMPLE 5

Following the general procedure of Example 2, the desired product is prepared from 87 parts of amylamine, 41 parts of sodium hydroxide, 76 parts of carbon disulfide, 827 parts of polyisobutenyl chloride ($\overline{Mn}$ 827, 4.3% chlorine) using 124 parts of dimethylformamide solvent.

EXAMPLE 6

Ammonia gas, 34 parts, is bubbled into a solution of 76 parts of carbon disulfide in benzene. The mixture is allowed to react at 20° C. for 0.5 hour, and then a 20% aqueous solution containing 41 grams of sodium hydroxide is added. The intermediate thus formed is separated from the organic phase by decantation, and 124 parts of dimethylformamide and 827 parts of polyisobutenyl chloride described in Example 5 are added. The mixture is heated for 12 hours at 90°–100° C. and then 588 parts of mineral oil is added. The oil solution is dissolved in benzene and washed with water, after which the benzene is removed by vacuum distillation. After filtration, the desired product is obtained and a 60% oil solution containing 0.21% nitrogen and 0.846% sulfur.

EXAMPLE 7

Following the procedure of Example 2, sodium diamyldithiocarbamate is prepared from 0.5 mole each of diamylamine, 20% aqueous sodium hydroxide solution and carbon disulfide. Polyisobutenyl chloride, 425 parts, is added and the mixture is heated at 90°–100° C. for 12 hours. To the mixture is added 348 parts of mineral oil, after which the volatile constituents are removed by vacuum distillation and the product is filtered. There is obtained a 60% oil solution of the desired product.

EXAMPLE 8

Following the general procedure of Example 2, a product is prepared from 1 mole each of polyisobutenyl chloride, carbon disulfide, sodium hydroxide and aminoethylpiperazine.

EXAMPLE 9

A product is prepared by the general method of Example 2 substituting 1 mole of cyclohexylamine for the diamylamine.

EXAMPLE 10

A product is prepared by the method of Example 2, substituting 1 mole of dimethylaniline for the diamylamine.

EXAMPLE 11

Polyisobutenyl bromide containing 8.2% bromine (made by bromination with N-bromosuccinimide of a polyisobutylene of Mn 960) is reacted with diethylene triamine and $CS_2$ is essentially the same manner as described in Example 3 to provide as a filtrate the desired product.

EXAMPLE 12

To a mixture of 841 grams of the polyisobutenyl chloride described in Example 1(A) and 80 grams of powdered sodium hydroxide in 1000 parts of toluene and 300 parts of isopropyl alcohol is slowly added over a period of one hour 100 parts of hydrazine hydrate. The reaction mixture is refluxed for 16 hours, then decanted into a separatory funnel, extracted twice with 20% aqueous sodium hydroxide and then twice with water. Stripping to 120° C./5mm provides a viscous residue which is diluted with 20% mineral oil. The oil solution is then filtered to provide the desired amino intermediate. This intermediate is reacted with carbon disulfide in essentially the same manner described in Example 4 to provide the desired final product.

EXAMPLE 13

A nitrogen-and sulfur-containing composition is made in essentially the same manner set forth in Example 12 except that 130 parts of monomethylhydrazine is used in place of hydrazine hydrate.

EXAMPLE 14

A nitrogen- and sulfur-containing composition is prepared in essentially the same manner set forth in Example 12 except that 140 parts of hydroxylamine hydrochloride is substituted for the hydrazine hydrate.

EXAMPLE 15

To a mixture of 375 parts of tris(hydroxymethyl) aminomethane and 500 parts of isooctyl alcohol at 100° C. is added over a 4 hour period a mixture of 1139 parts of polyisobutenyl chloride (4.68% chlorine) in 200 parts of isooctyl alcohol. The mixture is heated to 150°–185° C. for 6 hours and then stripped to 172° C./15mm. Filtration through filter aid provides the desired intermediate which is then mixed at room temperature with 150 parts of carbon disulfide and 1000 parts toluene. This mixture is heated at 50° C. for 4 hours, stripped to 100° C./15mm and the residue filtered to provide the desired final product as a filtrate.

EXAMPLE 16

To a mixture of 163 parts of the commercial ethylene polyamine mixture of Example 1(A), 41 parts of aqueous sodium hydroxide and 124 parts of dimethyl formamide is added at 50°–60° C. over a period of 1 hour, 76 parts of carbon disulfide. Then 127 parts of polyisobutenyl chloride is added to the mixture and it is heated for a total of 24 hours at 90°–100° C. Diluent oil (645 parts) is added and the resultant mixture washed three times with water after adding an equal volume of benzene as a diluent. The washed organic layer is then stripped to 120° C./20mm and the residue filtered through filter aid to provide the desired final product.

EXAMPLE 17

Sodium trithiocarbonate is formed is situ by reacting 180 parts of sodium sulfide nona-hydrate in aqueous solution with 100 parts of carbon disulfide at 47° C. for 2 hours. Then a mixture of 95 parts of dimethylformamide and 637 parts of polyisobutenyl chloride (8.38% chlorine) is added. The mixture is refluxed for 24 hours and 450 parts of diluent oil is added. After washing three times with water, the organic solution is stripped to 110° C./20mm and filtered through filter aid to provide a solution of the desired intermediate which is then mixed with 126 parts of diethylene triamine and heated to 120° C. for 4 hours. Filtration through filer aid yields the desired product in an oil solution.

EXAMPLE 18

To a mixture of 600 parts of carbon disulfide in 800 parts of 50% aqueous ethanol is added 374 parts of ethylene diamine over a two hour period. The reaction mixtue is then heated to 80° C. causing excess carbon disulfide to reflux. Aqueous hydrogen chloride, 37% (90 parts) is added and the mixture heated to 90°–100° C. for 4 hours. The solid precipitate formed is separated by filtration and dried at 90° C./20mm. This intermediate is reacted with the polyisobutenyl chloride of 1(A) in essentially the same manner set forth in 1(A), to provide the desired product.

EXAMPLE 19

A mixture of 180 parts of the polyisobutenyl chloride described in 1(A), 16 parts of diethylene triamine, 76 parts of carbon disulfide and 200 parts of xylene is heated at reflux for 26 hours. The mixture is stripped to 140° C./20mm, 200 parts of diluent oil added and filtered through filter aid to give an oil solution of the desired product.

The fuel compositions of the present invention contain a major proportion of a normally liquid hydrocarbon fuel, usually a petroleum distillate fuel, such as aviation or motor gasoline, diesel fuel or fuel oil as defined by ASTM Specification D-396. Particularly preferred is gasoline, that is, a mixture of hydrocarbons having an ASTM boiling point of about 60° C. at the 10% distillation point to about 205° C. at the 90% distillation point. Such gasolines are further described in ASTM Specification D-439-68T.

Generally, these fuel compositions contain an amount of the compositions of this invention sufficient to endow the fuel with detergent properties; usually this amount is 1 to 50,000, preferably 4 to 5000 parts by weight of the reaction product per million parts by weight of fuel.

As previously indicated, the products of this invention are also useful as additives in preparing lubricant compositions where they function primarily as detergents and dispersants, particularly where the oil is subjected to high temperature environments. They can be employed in a variety of lubricant compositions based on diverse oils of lubricating viscosity, including natural and synthetic lubricating oils and mixtures thereof. These lubricant compositions include crankcase lubricating oils for sparkignited and compression-ignited internal combustion engines including automobile and truck engines, two-cycle engines, aviation piston engines, marine and railroad diesel engines and the like. However, automatic transmission fluids, transaxle lubricants, gear lubricants, metal-working lubricants, hydraulic fluids and other lubricating oil and grease compositions can also benefit from the incorporation therein of the products of the present invention.

Natural oils include animal oils and vegetable oils (e.g., castor oil, lard oil) as well as liquid petroleum oils and solvent-refined or acid-refined mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); alkylbenzenes (e.g., dodecylbenzenes, tetradecylbenzenes, dinonylbenzenes, di-(2-ethylhexyl)benzenes, etc.); polyphenyls (e.g., biphenyls, terphenyls, etc.); and the like.

Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methyl-polyisopropylene glycol ether having an average molecular weight of 1000, diphenyl ether or polyethylene glycol having a molecular weight of 500 – 1000, diethyl ether of polypropylene glycol having a molecular weight of 1000 – 1500, etc) or mono- and polycarboxylic esters thereof, for example, the acetic acid esters, mixed $C_3$-$C_8$ fatty acid esters, or the $C_{13}$Oxo acid diester of tetraethylene glycol.

Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, ethylene glycol, etc.). Specific examples of these esters include dibutyl adepate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as trimethylol propane, pentaerythritol, dipentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-2-tetraethyl)silicate, tetra-(p-tert-butylphenyl)silicate, hexyl-(4-methyl-2-pentoxy)-disiloxane, poly(methyl)siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Generally, the lubricant compositions of the present invention could contain an amount of the reaction products of this invention sufficient to provide the composition with detergent properties. Normally this amount will be about 0.05 to about 20, preferably about 0.50 to about 10% of the total weight of the lubricant composition. In lubricating oils operated under extremely adverse conditions, such as lubricating oils for marine diesel engines, the reaction products of this invention may be present in amounts of up to about 30% by weight.

The fuel compositions of this invention can contain, in addition to the reaction products of this invention, other additives which are well-known to those of skill in the art. These can include anti-knock agents such as tetra-alkyl lead compounds, lead scavengers such as haloalkanes, deposit preventers or modifiers such as triaryl phosphates, dyes, cetane improvers, anti-oxidants such as 2,6-di-tertiary butyl-4-methylphenyol, rust inhibitors, such as alkylated succinic acids and anhydrides, bacteriostatic agents, gum inhibitors, metal deactivators, upper cylinder lubricants and the like.

The lubricant compositions of the present invention can contain, in addition to the reaction products of this invention, other additives that are normally used in lubricants. Such additives include, for example, auxiliary detergents of the ash-forming and of the ashless type, viscosity index improving agents, pour-point depressants, anti-foam agents, extreme pressure agents, rust-inhibiting agents, oxidation and corrosion inhibiting agents.

In a preferred embodiment of the present invention, the afore-described reaction products are combined with an ashless dispersant. Such ashless dispersants are preferably esters of a mono- or polyol and a high molecular weight mono- or polycarboxylic acid acylating agent containing at least 30 carbon atoms in the acyl moiety. Such esters are well known to those of skill in the art. See, for example, French Pat. No. 1,396,645, British Pat. Nos. 981,850 and 1,055,337 and U.S. Pat. Nos. 3,255,108; 3,311,558; 3,331,776; 3,346,354; 3,579,450; 3,542,680; 3,381,022; 3,639,242; 3,697,428; 3,708,522; and, British Patent Specification No. 1,306,529. These patents are expressly incorporated herein by reference for their disclosure of suitable esters and methods for their preparation. Generally, the weight ratio of the reaction products of this invention to the aforesaid ashless dispersants is about 0.1 to 10.0, preferably 0.1 to 10 parts of reaction product to 1 part ashless dispersant. Preferred weight ratios are between 0.5 to 2.0 parts reaction product to 1 part dispersant. In still another embodiment of this invention, the inventive additives are combined with Mannich condensation products formed from substituted phenols, aldehydes, polyamines, and substituted pyridines. Such condensation products are described in U.S. Pat. Nos. 3,649,659; 3,558,743; 3,539,633; 3,704,308; and 3,725,277.

The reaction products of this invention can be added directly to the fuel or lubricant to be treated or they can be diluted with an inert solvent/diluent such as mineral oil to form an additive concentrate. These concentrates generally contain 20 to 90 percent reaction product and can contain in addition any of the above-described prior art additives, particularly the afore-described ashless dispersants in the aforesaid proportions.

The fuel compositions of this invention are exemplified by the following:

EXAMPLE 20

A gasoline having a Reid vapor pressure of 10.5 psi and containing 2.5 grams of lead per gallon and 100 parts per million parts of gasoline of the reaction product described in Example 1(B).

EXAMPLE 21

A diesel fuel oil containing 200 parts per million parts of fuel of the reaction product described in Example 2.

EXAMPLE 22

A gasoline having a Reid vapor pressure of 15 psi and containing 2.1 grams per gallon of tetraethyl lead and 15 parts per million parts of gasoline of the reaction product of Example 12.

Lubricant compositions and concentrate formulations of the present invention are exemplified by the following:

EXAMPLE 23

A solvent-refined, neutral SAE 10 mineral oil containing 1.5% of the reaction product described in Example 3(C).

EXAMPLE 24

A synthetic lubricant comprised predominantly of $C_5$-$C_9$ normal alcohol esters of a 50/50 molar mixture of adipic and glutaric acids containing 2.5% of the reaction product described in Example 4.

EXAMPLE 25

A solvent-refined paraffinic mineral oil having a viscosity at 40° C. of 175 SUS containing 2.5% tricresyl phosphate and 2.5% of the reaction product described in Example 12.

EXAMPLE 26

A concentrate for use in blending lubricating oils comprised of 50% of the mineral oil of Example 23 and 50% of the product described in Example 1(B).

EXAMPLE 27

A concentrate for treating diesel fuels which is comprised of 60% kerosene and 40% of the product described in Example 5.

The lubricant and liquid fuel compositions of this invention and the reaction products and the processes for preparing these products have been specifically set forth above to aid those skilled in the art in understanding and practicing the invention. Many obvious variations and departures from the specific disclosure will be apparent to those of skill in the art based on principles and teachings herein and in the prior art. Such variations and departures are contemplated as being within the scope of the present invention as defined by the appended claims.

What is claimed is:

1. A process for preparing sulfur- and nitrogen-containing organic compositions which comprises reacting at a temperature above about 0° C. (A) at least one amino compound chosen from the group consisting of amines, hydroxy amines, heterocyclic amines, polyamines, hydrazines, substituted hydrazines, hydroxyl amines and ammonia, (B) carbon disulfide, and (C) at least one halogenated aliphatic hydrocarbon of at least about 25 carbon atoms, said halogenated hydrocarbon (C) having between about 0.1 and 15% halogen.

2. A process for preparing sulfur- and nitrogen-containing organic compositions which comprises reacting, at a temperature of at least about 0° C, (A) at least one polyalkylene polyamine of the formula

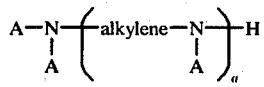

wherein a is an average of integers between 1 and about 10, each A is independently a hydrogen atom, hydrocarbyl group or hydroxy-substituted hydrocarbyl group having up to about 30 atoms with the proviso that two A groups can be taken together with A to form a ring of from 5 to 6 annular members and up to 12 carbon atoms, and alkylene is a lower alkylene group having between 1 and 10 carbon atoms, (B) carbon disulfide and (C) at least one halogenated substantially aliphatic polymer or interpolymer of a $C_2$-$C_6$ 1-olefin of number average molecular weight of about 400 to about 5000 and having an average halogen content of at least one chlorine atom per polymer molecule up to about one chlorine atom per 25 carbon atoms in (C).

3. A process for preparing sulfur- and nitrogen-containing organic compositions which comprises first reacting (A) at least one amine, hydroxy amine, polyamine, hydrazine or organically substituted hydrazine, hydroxyl amine or ammonia with (C) at least one halogenated aliphatic hydrocarbon of at least about 25 carbon atoms, said halogenated hydrocarbon (C) having between about 0.1 and 15% halogen, to form an intermediate and then reacting said intermediate with (B) carbon disulfide.

4. A process for preparing a sulfur- and nitrogen-containing organic composition which comprises reacting simultaneously at a temperature above about 25° C. (A) at least one amino compound selected from the group consisting of amines, hydroxyamines, polyamines, heterocyclic amines, hydrazines, substituted hydrazines, hydroxylamines or ammonia, (B) carbon disulfide and (C) at least one halogenated aliphatic hydrocarbon of at least about 25 carbon atoms, said halogenated hydrocarbon (C) having between about 0.1 and 15% halogen.

5. A sulfur- and nitrogen-containing organic composition prepared by the process which comprises reacting at a temperature above about 0° C. (A) at least one amino compound chosen from the group consisting of amines, hydroxy amines, heterocyclic amines, polyamines, hydrazines, substituted hydrazines, hydroxyl amines and ammonia, (B) carbon disulfide, and (C) at least one halogenated aliphatic hydrocarbon of at least about 25 carbon atoms, said halogenated hydrocarbon (C) having between about 0.1 and 15% halogen.

6. A composition as claimed in claim 5 wherein (A) contains at least one —NH group.

7. A sulfur- and nitrogen-containing organic composition prepared by the process which comprises reacting, at a temperature of at least about 0° C. (A) at least one polyalkylene polyamine of the formula

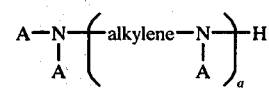

wherein a is an average of integers between 1 and about 10, each A is independently a hydrogen atom, hydrocarbyl group or hydroxy-substituted hydrocarbyl group having up to about 30 atoms with the proviso that two (A) groups can be taken together with A to form a ring of form 5 to 6 annular members and up to 12 carbon atoms, and alkylene is a lower alkylene group having between 1 and 10 carbon atoms, (B) carbon disulfide and (C) at least one halogenated, substantially aliphatic polymer or interpolymer of a $C_2$-$C_6$ 1-olefin of number average molecular weight of about 400 to about 5000 and having an average halogen content of at least one chlorine atom per molecule up to about one chlorine atom per 25 carbon atoms in (C).

8. A sulfur- and nitrogen-containing organic composition prepared by the process which comprises first reacting (A) at least one amine, hydroxy amine, polyamine, hydrazine or organically substituted hydrazine, hydroxyl amine or ammonia with (C) at least one halogenated aliphatic hydrocarbon of at least about 25 carbon atoms, said halogenated hydrocarbon (C) having between about 0.1 and 15% halogen, to form an intermediate and then reacting said intermediate with (B) carbon disulfide.

9. A sulfur- and nitrogen-containing organic composition prepared by the process which comprises reacting at a temperature above about 0° C. (A) at least one polyalkylene polyamine of the general formula

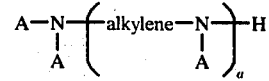

wherein a is an average of integers between 1 and about 10, each A is independently a hydrogen atom, hydrocarbyl group or a hydroxy-substituted hydrocarbyl group having up to about 30 atoms, with the proviso that two A groups can be taken together with A to form a ring of from 5 to 6 annular members and up to 12 carbon atoms and alkylene is a lower alkylene group having between 1 and 10 carbon atoms, and (C) at least one halogenated substantially, aliphatic hydrocarbon of at least 25 carbon atoms, said halogenated hydrocarbon (C) having between about 0.1 and 15% halogen, to form an intermediate and then reacting said intermediate with (B) carbon disulfide.

10. A sulfur- and nitrogen-containing organic composition prepared by the process which comprises first reacting (A) at least one amine, hydroxy amine, polyamine, hydrazine or organically substituted hydrazine, hydroxyl amine or ammonia with (C) at least one halogenated aliphatic hydrocarbon of at least about 25 carbon atoms, said halogenated hydrocarbon (C) having between about 0.1 and 15% halogen, to form an amino intermediate of the general formula

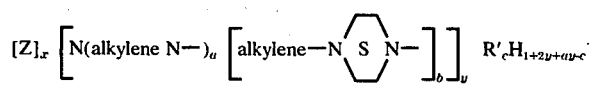

wherein

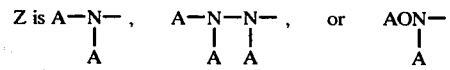

each when $x=1$; each A is independently hydrogen, a hydrocarbyl group of from 1 up to about 30 carbon atoms, or a hydroxy hydrocarbyl group of up to about 30 carbon atoms with the proviso that two A groups can be taken together to form a ring of from 5 to 6 annular members and up to 12 carbon atoms; alkylene is a lower alkylene group having between 1 and 10 carbon atoms; R' is an aliphatic hydrocarbon radical of from about 400 to 100,000 number average molecular weight; $a$ is an average of integers of from 0 to about 10; $b$ is an average of integers of from 0 to about 5; $a+2b$ is an average of integers of from 1 to about 10; $c$ is an average of integers of from 1 to about 10 and is equal to or less than the number of amino groups in the molecule; $x$ is 0 or 1; $y$ is 0 or 1; and $x+y$ equals 1, and then reacting said intermediate with (B) carbon disulfide.

11. A sulfur- and nitrogen-containing organic composition prepared by the process which comprises reacting at a temperature above about 0° C. (A) at least one polyalkylene polyamine of the general formula

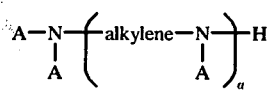

wherein $a$ is an average of integers between 1 and about 10, each A is independently a hydrogen atom, hydrocarbyl group of a hydroxy-substituted hydrocarbyl group having up to about 30 atoms, with the proviso that two A groups can be taken together with A to form a ring of from 5 to 6 annular members and up to 12 carbon atoms and alkylene is a lower alkylene group having between 1 and 10 carbon atoms, and (C) at least one halogenated substantially aliphatic hydrocarbon of at least 25 carbon atoms, said halogenated hydrocarbon (C) having between about 0.1 and 15% halogen, to form a amino intermediate of the general formula

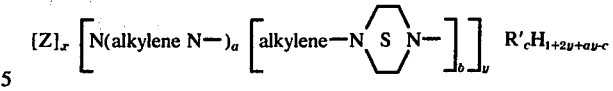

wherein Z is

when $x=1$; A is independently hydrogen, hydrocarbyl of from 1 up to about 30 carbon atoms with the proviso that two A groups can be taken together with A to form a ring of from 5 to 6 annular members and up to 12 carbon atoms; alkylene is as defined above; R' is an aliphatic hydrocarbon radical from about 400 to 100,000 number average molecular weight; $a$ is an average of integers of from 0 to about 5; $a+2b$ is an average of integers of from 1 to about 10; $c$ is an average of integers of from 1 to about 10 and is equal to or less than the number of amino groups in the molecule; $x$ is 0 or 1; $y$ is 0 or 1; and $x+y$ equals 1, and then reacting said intermediate with (B) carbon disulfide.

12. A sulfur- and nitrogen-containing organic composition prepared by the process which comprises reacting at a temperature above about 25° C. (A) at least one amino compound selected from the group consisting of amines, polyamines, hydroxy amines, heterocyclic amines, hydroxyl amines, hydrazines, substituted hydrazines and ammonia with (B) carbon disulfide to form an intermediate which is then reacted with (C) at least one halogenated aliphatic hydrocarbon of at least 25 carbon atoms, said halogenated hydrocarbon (C) having between about 0.1 and 15% halogen.

13. A sulfur- and nitrogen-containing organic composition prepared by the process which comprises reacting at a temperature above about 0° C. (A) at least one polyalkylene polyamine of the general formula

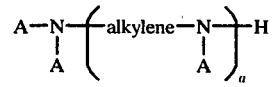

wherein $a$ is an average of integers between 1 and about 10, each A is independently a hydrogen atom, a hydrocarbyl group or a hydroxy-substituted hydrocarbyl group having up to about 30 atoms, with the proviso that two A groups can be taken together with A to form a ring of from 5 to 6 annular members and up to 12 carbon atoms; alkylene is a lower alkylene group having between 1 and 10 carbon atoms with (B) carbon disulfide to form an intermediate which is then reacted with (C) at least one chlorinated aliphatic polymer or copolymer of a $C_2$-$C_8$ alpha-olefin having an average halogen content of at least one chlorine atom per molecule up to about one chlorine atom per 25 carbon atoms in (C).

14. A sulfur- and nitrogen-containing organic composition prepared by the process which comprises reacting simultaneously at a temperature above about 25° C. (A) at least one amino compound selected from the group consisting of amines, hydroxy amines, polyamines, heterocyclic amines, hydrazines, substituted hydrazines, hydroxyl amines or ammonia, (B) carbon disulfide and (C) at least one halogenated aliphatic hydrocarbon of at least about 25 carbon atoms, said halogenated hydrocarbon (C) having between about 0.1 and 15% halogen.

15. A process for preparing sulfur- and nitrogen-containing organic compositions which comprises reacting simultaneously at a temperature above about 25° C. (A) at least one polyalkylene polyamine of the general formula

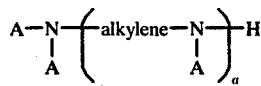

wherein $a$ is an average of integers between 1 and about 10, each A is independently a hydrogen atom, hydrocarbyl group or a hydroxy-substituted substantially hydrocarbyl group having up to about 30 atoms; with the proviso that two A groups can be taken together with A to form a ring of from 5 to 6 annular members and up to 12 carbon atoms; and alkylene is a lower alkylene group having between 1 and 10 carbon atoms, (B) carbon disulfide, and (C) at least one chlorinated aliphatic polymer or copolymer of a $C_2$-$C_6$ 1-olefin having an average halogen content of at least one chlorine atom per molecular up to about one chlorine atoms per 25 carbon atoms in (C).

16. A composition as claimed in claim 7 wherein each A is a hydrogen atom and alkylene is an ethylene, propylene and butylene group.

17. A composition as claimed in claim 9 wherein each A is a hydrogen atom and alkylene is an ethylene, propylene and butylene group.

18. A composition as claimed in claim 11 wherein each A is a hydrogen atom and alkylene is an ethylene, propylene and butylene group.

19. A composition as claimed in claim 13 wherein each A is a hydrogen atom and alkylene is an ethylene, propylene and butylene group.

20. A composition as claimed in claim 15 wherein each A is a hydrogen atom and alkylene is an ethylene, propylene and butylene group.

* * * * *